Oct. 11, 1966     L. LOPEZ     3,277,754

ADJUSTABLE SLICING TOOL

Filed Nov. 23, 1964

INVENTOR.

Luis Lopez

BY Jacobi & Davidson

ATTORNEYS 3,277,754
ADJUSTABLE SLICING TOOL
Luis Lopez, 4110 Laguna St., Coral Gables, Fla.
Filed Nov. 23, 1964, Ser. No. 413,042
8 Claims. (Cl. 83—4)

This invention relates to an adjustable slicing tool and more particularly it relates to a manually operable slicing tool which can be used to cut preselected thickness from elongated sheets of material, such as, for instance, sheets of form rubber or foam polyurethane.

Foam sheets are generally manufactured as elongated webs having a length of several feet and a thickness of several inches. Such sheets or webs find utility in many fields, but have proved to be particularly useful in the manufacture of furniture. Because of their softness and resiliency, sheets of such foam material are widely used by furniture manufacturers for forming cushions, pillows and the like. During such manufacture, it becomes necessary to cut a segment of the foam out of the elongated web thereof, and to form such a segment with the proper dimensions. Naturally, to assure that such a segment has the proper dimensions, and to diminish the amount of scrap material involved, it is important that the severing of the segment from the web be done with accuracy and care.

In performing such a severing operation to separate a selected segment of proper dimensions from a large foam web or sheet, much difficulty has been encountered in attempting to sever the sheet longitudinally to create a finished segment having the proper thickness. If, for example, it were desired to form elongated sofa or couch cushions having a length of six feet and a thickness of four inches, and the foam stock from which such cushions were to be formed was several feet in length and twelve inches thick, the initial step involved would be to cut a six foot length of foam material from the elongated web thereof. This would not be a particularly difficult operation since it would merely involve a straight slicing transversely through a twelve inch thickness. However, such a six foot length would then have to be longitudinally sliced into thirds, to thereby form three seat cushions, each having a thickness of four inches. In accomplishing such slicing, it will be appreciated that extreme accuracy must be maintained throughout the entire longitudinal slice of six feet, or else the resulting cushion sections will not have the requisite four inch thickness uniformly therealong. For example, if during the slicing operation along the six foot longitudinal length, the slice were to vary only one quarter inch, the result would be a cushion having a three inch thickness at one end thereof and only a two and three quarter inch thickness at the opposite end thereof. Naturally, if a cushion of this type were covered with fabric material, the fabric material would fit improperly and the resulting piece of furniture would have an unsightly appearance.

It will, therefore, be apparent that there is a need for extreme care and accuracy to be exercised in performing longitudinal slicing of the type previously described. In the past, numerous efforts have been made to satisfactorily accomplish such accurate longitudinal slicing, but none of these efforts have proved completely successful. Furthermore, it must also be recognized that in such severing operations, the desired thickness of material will often vary. Thus, during one operation, a four inch thickness may be desired, whereas in the next operation, a five inch thickness may be needed. It would therefore appear to be highly beneficial to provide a severing or slicing device which can accurately perform longitudinal slicing operations, yet can be easily adjusted to enable slicing of varying preselected thicknesses.

With the foregoing in mind, it is, therefore, an object of the present invention to provide an improved slicing device which can successfully and accurately slice elongated sheets of material into preselected thicknesses.

Another object of the present invention is to provide a slicing device which can be readily adjusted to enable an operator to slice a sheet of material to any preselected thickness desired.

Further objects of the present invention include the provision of an adjustable slicing tool which: (a) is inexpensive to produce, yet is durable in operation; (b) can be easily manually manipulated by an individual operator; (c) does not require any operating motor or external power supply, but instead can be easily operated by hand; (d) can accurately be adjusted in a simple manner to assure that a proper thickness of material will be sliced; and, (e) can cut either linearly or angularly through a sheet of material, at a preselected height in such a sheet.

Further objects, advantages and salient features of the present invention will become apparent from the following detailed description, which, taken in connection with the annexed drawings, discloses a preferred embodiment thereof.

Referring to the drawings.

Figure 1:
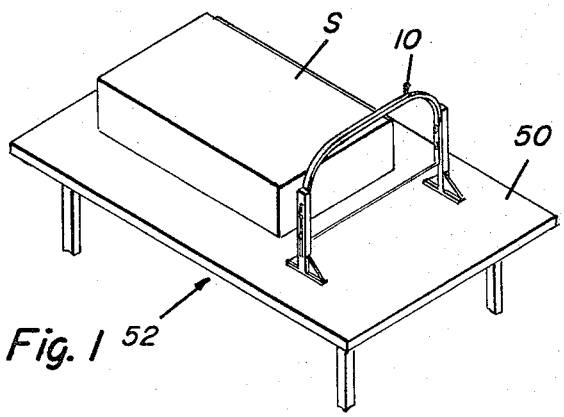
FIGURE 1 is a perspective view of an adjustable slicing tool in accordance with the present invention, shown in conjunction with a sheet of material to be sliced and a supporting surface for such a sheet.

In general, the adjustable slicing tool in accordance with the principles of the present invention may be generally designated 10. Such a tool 10 includes leg member generally designated 12, bracket means generally designated 14, cutting means generally designated 16 and means generally designated 18 movably securing the bracket means 14 to the leg members 12.

Figure 3:
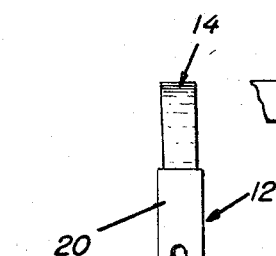
FIGURE 3 is a fragmentary side elevational view of the adjustable slicing tool; and, FIGURE 4 is a side elevational view of the adjustable slicing tool, with the sheet of material to be sliced being disposed angularly to its supporting surface.
Figure 2:
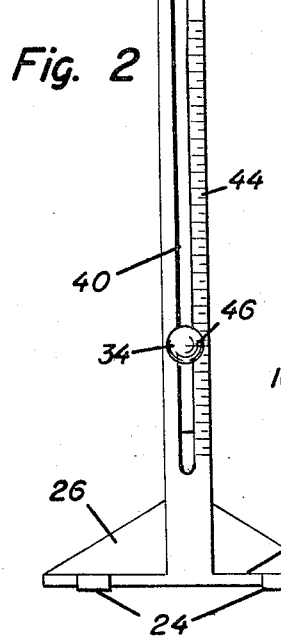
FIGURE 2 is an end view of the adjustable slicing tool.

A pair of leg members 12 are provided in the tool 10, and each such leg member includes a generally upstanding elongated portion 20 which has an enlarged substantially flat abutment foot 22 at its lower end. The abutment feet 22 enable the leg members to stand upright upon a supporting surface, and, if desired, projecting button elements 24 may be provided in such feet to enhance the slidability of such feet across a supporting surface. Such buttons 24 may be formed of a synthetic resinous material, such as nylon, or may be formed of stainless steel, or of any other suitable material which will increase the slidability of the feet 22. The button means 24 may be mounted into apertures in the bottom of the feet 22, or alternatively, may merely be slipped over such feet as shown in FIGURES 2 and 3. Supporting webs 26 may extend between the feet 22 and the upright portion 20 on the leg members to assure rigidity thereof.

The bracket means 14 comprises a generally U-shaped member defined by a central portion 28 and a pair of integral depending portions 30 projecting perpendicularly downward from opposite ends of the central portion. Such depending portions 30 thus extend generally parallel to one another.

The cutting means 16 can be a cutting blade, wire, or other similar suitable cutting element which can be used for the purpose of severing sheets of material. As shown in FIGURE 3, such a cutting element 16 is attached to the lower ends of the depending bracket portions 30 by screws 32 or other similar fastening means. As such, a cutting blade 16 may be easily removed from, or replaced upon, the bracket means 14. When the blade is so attached to the bracket means, it will be noted that the disposition of the blade is substantially parallel to the disposition of the central portion 28 at the upper end of the bracket.

As previously indicated, means 18 is provided for interconnecting the bracket 14, with the cutting element 16 thereon, to each of the leg members 12, to thereby convert the entire unit into an assembled slicing tool. This means 18 takes the form of a selectively releasable and lockable fastening assembly which permits the height of the bracket to be varied within the leg members 12. As such, the means 18 includes a screw means having an enlarged head 34 and a threaded shank 36, and a nut means, such as a wing nut 38, which can be screwed onto the end of the threaded shank 36. An elongated slot 40 is provided in the upstanding portion 20 of each leg member, and an aperture 42 is provided in each depending portion 30 on the bracket 14, with the size of the aperture 42 being sufficient to accommodate passage of the screw shank 36. As shown, the shank projects through the slot 40 and the aperture 42, with the head 34 being disposed on the outside of the leg member 12 and the nut 38 being disposed on the inside of the depending bracket portion 30. When the nut is tightened toward the head portion 34, the depending bracket portion 30 and the upstanding leg portion 20 are brought into frictional contact to prevent vertical movement of the blade. If, on the other hand, the nut 38 is loosened, the bracket means and its attached cutting blade may be vertically moved within the leg members 20. It will, of course, be apparent that an equally suitable assembly means can be provided by reversing the screw and nut and thereby having the screw head 34 on the interior of the bracket depending portion 30 and the nut 38 on the exterior of the leg member 12.

As will be obvious, one such attachment means 18 is provided at each side of the tool, that is, one means 18 for each assembled leg portion 20 and the bracket portion 30. When the nut means 38 is loosened, the entire bracket and cutting blade can be raised merely by lifting the central portion 28 until the blade 16 reaches a desired elevation, and the nut means may thereafter be tightened to maintain the blade at this desired elevation. In order to provide an accurate measurement of the amount of elevation necessary or desired in any particular instance, calibrations 44 may be provided on the exterior of at least one of the leg member portions 20 adjacent the slot 40 therein. An indicating line 46 may be provided on the screw head 34 to cooperate with the calibrations 44 in indicating incremental movement of the bracket and blade.

Figure 4:
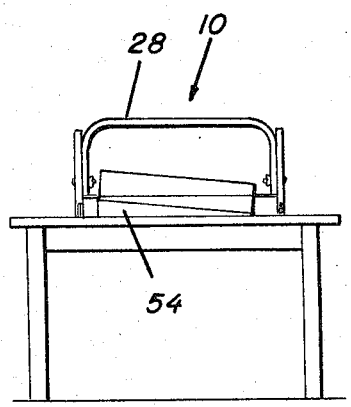

To appreciate the manner in which the adjustable slicing tool 10 is used, attention is directed to FIGURE 1 wherein the tool 10 is shown upon a flat planar supporting surface 50 such as the top of a table or bench generally designated 52. A sheet S of material to be sliced, such as a sheet of foam rubber or plastic, is likewise placed upon the flat supporting surface 50. The width of such a sheet of material is somewhat less than the width of the bracket means 14 and of the cutting element 16, and thus the leg members 12 of the tool are disposed outwardly of the sides of the sheet S. To initiate a slicing operation, the tool 10 is moved on the supporting surface until it is adjacent one end of the sheet S. Then, the means 18 is loosened to enable the cutting element 16 to be moved relative to the supporting surface. This relative movement enables the blade to be moved to a preselected height above the supporting surface, and this height will thus correspond to the thickness of sheet material remaining beneath the blade after a slicing operation is completed. After such adjustment has been properly made, the means 18 is tightenend to lock the blade at its desired elevation, and the severing means commences by lateral reciprocating of the tool 10. Such reciprocation can be accomplished by an operator who stands beside the table 52, grasping the tool about a leg member 12 which is used as a handle. Then, the operator moves the saw forward and backward in a lateral direction, thus accomplishing the slicing in the same manner as a sawing operation. During such lateral reciprocation, the feet 22 on the tool slide freely across the supporting surface 50 because of the button means 24 thereon. As such lateral reciprocation is carried out, the tool is also moved longitudinally, and thus a slice or cut gradually proceeds from one end of the sheet S along the longitudinal length thereof. When such an operation has been completed, the sheet S has been longitudinally sliced to form a sheet segment having a desired thickness. If it is desired to produce an angular slice through the sheet S, a wedge 54 may be placed beneath one end of the sheet, as shown in FIGURE 4, to thus dispose the sheet S at the proper angular relationship with respect to the cutting element 16.

From the foregoing material, it should be apparent that the slicing tool 10 enables an operator to accurately and easily slice a sheet of material S to a preselected thickness. While the tool itself has been illustrated in a simple manner to facilitate understanding thereof, it will be appreciated that certain minor variations may be made therein without departing from the spirit and scope of the present invention. For instance, the upstanding portion 20 of the leg members 12 may be formed as a generally C-shaped channel with the depending portions 30 on the bracket being disposed within the opening in such a channel. Similarly, the disposition of the slot 40 and aperture 42 may be reversed, so that the slot is provided in the bracket portion 30 and the aperture is provided in the leg portion 20. Other similar variations may also come to mind, and such variations are intended to be comprehended within the scope of the present invention.

After reading the foregoing detailed description, it should be apparent that the objects set forth at the outset of the specification have been successfully achieved. Accordingly, what is claimed is:

1. An adjustable slicing tool comprising:
   a pair of upstanding leg members, each having a base abutment surface;
   an inverted substantially U-shaped bracket disposed between said leg members;
   a cutting element secured across the open end of said bracket; and
   means movably attaching said bracket to said leg members whereby said cutting element may be adjusted relatively to said base abutment surface;
   said base abutment surfaces being provided with at least a partial synthetic resinous portion to improve the slidability thereof.

2. An adjustable slicing tool which can be manually operated to slice elongated sheets of material which are placed upon a flat supporting surface, with the level at which said sheets are sliced being adjustable relative to said supporting surface to thus produce a finished sheet of material of predetermined thickness, said tool comprising:
   a pair of upstanding leg members which terminate at their lower ends in substantially flat abutment feet adapted to rest upon said supporting surface;
   a generally U-shaped bracket member defined by a central portion with depending portions disposed at the opposite ends thereof;
   said depending portions being integral with said central portion and being disposed substantially parallel to each other and perpendicular to said central portion;
   a cutting element interconnected between the lower ends of said depending portions and thus being substantially parallel to said central portion;
   said bracket member and its interconnected cutting element having a width between said depending portions exceeding the lateral width of said sheets of material to be sliced;

said leg members being disposed in spaced parallel upstanding relationship on opposite sides of a sheet of material to be sliced;

said bracket member and its interconnected cutting element being disposed between said spaced parallel leg members with said central portion and said cutting element extending substantially laterally of said sheet of material to be sliced; and means interconnecting each leg member with a juxtaposed bracket depending portion to thus form said bracket member cutting element and leg members into an assembled tool;

said means being selectively releasable and lockable to thus permit the height of said cutting element to be varied relative to said supporting surface;

said tool being manually operable to effect slicing of said sheet of material by moving said feet along said supporting surface longitudinally of said sheet of material and thus drawing said cutting element through said sheet of material to slice the same to a preselected thickness.

3. An adjustable slicing tool as defined in claim 2 wherein said means includes:

an elongated slot in each leg member;

an aperture in each depending portion;

a screw means having an enlarged head at one end thereof and a threaded end at the other end thereof; and a nut means engageable with the threaded end of said screw means;

said screw means projecting through said aperture and said slot in a juxtaposed leg member and depending portion;

said nut means being threadable toward enlarged head to lock said juxtaposed leg member and depending portion together;

said nut means being threadable away from said enlarged head to release said juxtaposed leg member and depending portion.

4. An adjustable slicing tool as defined in claim 3 wherein at least one leg member is calibrated along the edges of said slot to indicate the level of adjustment of said cutting element.

5. An adjustable slicing tool as defined in claim 2 wherein said abutment feet are provided with button elements to enhance the slidability of said feet across said supporting surface.

6. An adjustable slicing tool comprising:

a pair of upstanding leg members, each having a base abutment surface;

an inverted substantially U-shaped bracket disposed between said leg members and having side members juxtaposed to said leg members;

a cutting element secured across the open end of said bracket substantially at the ends of said side members; and, means movably attaching said bracket to said leg members whereby said cutting element may be adjusted relatively to said base abutment surfaces;

said means including an elongated slot in at least one of said members, screw means extending through said elongated slot, and nut means removably secured to said screw means for selectively tightening at least one leg member and its juxtaposed side member into frictional contact.

7. An adjustable slicing tool as defined in claim 6 wherein said elongated slot is provided in said leg member and wherein said screw means extends through said slot and said juxtaposed side member.

8. An adjustable slicing tool as defined in claim 6 wherein at least one leg member is calibrated to indicate the level of adjustment of said cutting element.

References Cited by the Examiner

UNITED STATES PATENTS

| 610,829 | 8/1898 | Raney | 30—116 |
| 2,700,821 | 2/1955 | Aberlin. | |
| 2,883,748 | 4/1959 | Mora | 146—151 |
| 2,964,844 | 12/1960 | Steward et al. | 30—116 |

FOREIGN PATENTS

| 449,451 | 6/1948 | Canada. |
| 126,890 | 1/1902 | Germany. |
| 494,139 | 3/1930 | Germany. |
| 630,451 | 10/1949 | Great Britain. |

WILIAM W. DYER, JR., *Primary Examiner.*

L. B. TAYLOR, *Assistant Examiner.*